United States Patent Office 3,275,458
Patented Sept. 27, 1966

3,275,458
DEHYDRATED MASHED POTATO AND PROCESS
FOR MAKING SAME
Miles J. Willard, Jr., Idaho Falls, Idaho, assignor to
Rogers Brothers Company, Idaho Falls, Idaho, a corporation of Delaware
No Drawing. Continuation of application Ser. No. 120,482, June 29, 1961. This application Nov. 13, 1964, Ser. No. 411,087
23 Claims. (Cl. 99—207)

This invention relates to a new and improved process for dehydrating cooked mashed potatoes.

This application is a continuation of Miles J. Willard, Jr. application Serial Number 120,482, filed June 29, 1961, which is a continuation-in-part of Miles J. Willard Jr., application Serial Number 779,047, filed December 9, 1958, both now abandoned.

Because of the nature of the potato starch cells, it has been difficult to prepare a dehydrated potato product which can be quickly reconstituted by the addition of a hot liquid to form a non-pasty, non-lumpy mashed potato having the natural color, flavor and consistency of a freshly prepared product. Numerous dehydration procedures have been proposed having various advantages and disadvantages. Methods which have come into commercial production include the "add-back," the shred, and the flake processes.

The "add-back" process is based on the fact that cooked mashed potato, having a moisture content reduced to 50% or less, has its adhesive characteristics minimized to the point where it can be easily dried by conventional procedures without substantially cell rupture, to form a dehydrated product consisting largely of individual potato cells or aggregates of several such cells. The process is carried out by admixing cooked mashed potato with an approximately equal amount of the dried powder produced by a previous similar procedure, thereby bringing the moisture content down to about 40%, reducing the mixture to a fine powder and drying. Approximately one eighth of the dried product produced in any one cycle is withdrawn as finished product. The remainder must be recycled by addition to the next batch of moist mashed potato.

The dehydrated potato powder made in this manner reconstitutes readily into a mashed potato of good consistency and has the further advantage of high bulk density, which reduces packaging and shipping costs. It has, however, a number of serious disadvantages. The repeated recycling tends to produce objectionable flavors in the finished product. Processing must be carefully controlled at all times. One improper cycle can irretrievably damage the product of many subsequent cycles until the objectionable mix is so diluted that its effect becomes negligible. The process also poses the problem of the preparation of a satisfactory dehydrated starting material or seed powder. A suitable dry powder cannot be directly produced from moist mashed potato. The initial powder made from the first mash consists of hard and horny particles and must be repeatedly recycled by admixture with moist mash and drying until the quality is satisfactory for production of finished product.

The shred process permits direct dehydration of cooked mashed potatoes by a method comprising the extrusion of thoroughly mixed mashed potato onto a continuous belt or heated table, where it is dehydrated by a flow of heated air. The product dries with an interior tubular and porous structure and rehydrates rapidly. The extruded material, however, tends to clump during drying to form hard, horny pieces which do not reconstitute readily and form lumps in the rehydrated product. The bulk density of the product is, furthermore, very low.

The flake process produces a dehydrated product in flake form directly from mashed potato by spreading and rapidly drying a thin layer on a drum dryer, stripping the dried layer from the surface of the drum, and breaking into flakes of convenient size. The cell structure of the potato is maintained intact through the mashing and dehydration steps. The flakes can be rapidly reconstituted to produce a mashed potato of good consistency, retaining much of the natural flavor, vitamins and color of the original fresh product. The flakes cannot, however, be reduced to sizes much below about one-half to one-quarter inch in length without producing a noticeable pastiness upon reconstitution. This is due to rupture of cells along the broken edges. The requisite large flake size, therefore, results in products of low bulk density and consequent high packaging and transportation costs.

The object of this invention is to provide a process for making a dehydrated, free flowing, cooked mashed potato product, which can be rapidly reconstituted to a mashed potato of excellent consistency without loss of the original freshness of color and flavor.

Still another object is the production of a dehydrated mashed potato product of the high bulk density.

Another object is the production of a dehydrated mashed potato product which does not require the continued recycling of a portion of the finished product or, in fact, any recycling at all.

Still another object is to provide a process which is particularly well adaptable to economical, continuous operation.

Broadly speaking, the process comprises admixing cooked mashed potatoes with dehydrated potato flakes in an amount sufficient to produce a moist, friable mixture having a moisture content of about 30 to 50%, preferably about 35 to 45%, permitting the mixture to equilibrate its moisture content for at least about 20 minutes, remixing, and then drying to the desired final moisture content. Mixing of the moist and dry components to homogeneity is accomplished with the said of a fatty acid monoglyceride, preferably in admixture with a fatty acid triglyceride.

The cooked mashed potatoes, for use as the moist component or for preparation of the flake, can be prepared in well-known conventional fashion, with care being taken not to overcook or to mash in a manner so vigorous as to disrupt the cells. The potato is preferably sound, mature, and of the high solids content, mealy type, such as the Idaho Russet, although potatoes of lower solids content, such as the Katahdin, Kennebeck, Cobbler, or Pontiac, having a solids content of at least about 18%, can also be used. The potatoes are peeled, sliced and cooked, as by steaming, and mashed in any suitable and convenient manner, as by ricing or by means of flaking rolls. A suitable antioxidant, such as a sulfite or butylated hydroxy toluene, can be incorporated into the mashed potatoes, if desired, to extend the normal shelf life of the dehydrated product.

Mealiness of the finished reconstituted product, particularly in the case of potatoes of lower solids content, can be improved, if desired, by subjecting the raw potato prior to cooking to a precooking step at a temperature of about 140 to 180° F. for about 10 to 60 minutes, by immersion in a hot water bath or by treatment with steam or hot air, and then washing the potato pieces to remove surface starch.

The dehydrated flake can be prepared by applying the cooked mashed potato to the surface of an internally heated drum dryer and spread into a thin layer, as for example, by means of spreader rolls in the case of a single drum dryer, or by proper adjustment of the nip in the case of a double drum dryer. The layer of potato dries on the drum without rupture or other damage to the cells. After drying to at least 30% moisture content, preferably about 6 to 15%, the film is removed from the revolving drum in any suitable fashion, as by doctor knife, and broken into flakes of suitable size. The thickness of the dried film or flake should be no more than 20 mils and preferably in the range of about 4 to 10 mils.

When the dried film is broken down into flakes, some cell rupture occurs at the point of cleavage, releasing free starch. Where such cleavage is minimized by the production of relatively large flakes, e.g. about ½ to ¼ inch in the longest dimension, the flakes can be reconstituted without any noticeable pastiness. Further comminution tends to produce an undesirable stickiness.

I have found, however, that when the flake is admixed with cooked mashed potatoes, according to my new process, the flake can be comminuted to pieces having lengths in their largest dimension as small as about 40 mils to 45 mils (16 to 18 mesh), in a single cycle operation, namely where the finished product is prepared by the single mixing of flake and moist mashed potato and dried.

It will be understood that mil size as used in this specification refers to a flake product, the largest particles of which have the given dimension, the particles at or close to said dimension forming a substantial proportion of the product. Mesh size as here employed means the smallest mesh size, U.S. standard sieve, through which substantially all of the product can pass. It will be obvious that a substantial number of the particles in any given mesh size product will be sufficiently small to pass through a sieve of even smaller mesh size.

The smaller flake sizes have the advantage of promoting easier distribution of the flakes in the cooked mashed potatoes and reducing any tendency to lumpiness. It should be noted, however, that such problems can be overcome, to a substantial extent, by adjusting the conditions of the mixing operation, as, for example, by increasing mixing time. There is no critical limit with regard to maximum size, since the larger particles, e.g. ¼ to ½ inch or larger, are comminuted during mixing with the moist mashed potato.

Potato flake products smaller than about 40 mils can also be used in my process but require one or two recyclings to eliminate a pasty consistency of the reconstituted product. In other words the dried product prepared from the first mixture of flake and cooked mashed potato must be mixed with more cooked mashed potato and dried again. In this way the free starch, which would be sufficient to impart pastiness to the first mix is diluted in a second or third mix to the point where it is eliminated in the final dried product. I have found, however, that the minimum permissible flake size for a satisfactory product, even with recycling, is about 15 mils (40 mesh).

The dispersion of the flakes in the cooked mashed potatoes to form a homogeneous non-lumpy mixture requires a surface active distributing agent in the form of a higher fatty acid monoglyceride, such as glyceryl monopalmitate, glyceryl monolaurate, glyceryl monostearate and the like. The fatty acid is preferably of the saturated type. Unsaturated fatty acid monoglycerides are also effective for flake distribution, but because of their tendency to promote autooxidative deterioration and, thereby, to reduce shelf life of the finished product, it is desirable to include an antioxidant.

The surface-active monoglyceride reduces the tendency of the dry and moist particles to clump. They apparently slide across each other more freely, thus making possible even, uniform distribution.

The monoglyceride should generally constitute at least about 0.05 to 0.1% and, preferably, about 0.3% on a finished dry weight basis of the mix. There is no critical upper limit. In general, amounts above 1%, though not objectionable, do not produce sufficiently improved results to warrant the added cost.

The effect of the monoglyceride distributing agent is improved by introducing it in admixture with a higher fatty acid triglyceride, preferably saturated, though some unsaturations is permissible if accompanied by an antioxidant to minimize autooxidative reactions in the dehydrated product. The fatty acid components of the triglyceride can be, for example, lauric, myristic, palmitic, stearic, arachidic or behenic acids and mixtures thereof, as found, for example in various hydrogenated vegetable oils, such as cottonseed, corn, soybean, peanut and coconut oils, or animal fats of low iodine number. Substantial improvement is obtained with amounts of triglyceride as low as about 0.4 to 0.5% on a dry weight basis of the mix. The preferred minimum is about 1 to 1.5%. There is no critical upper maximum, though, in general, amounts above about 3% do not produce sufficiently improved results to make them economically feasible.

The monoglyceride can be dispersed in the triglyceride as, for example, by melting the two materials together, and employed as such or in aqueous emulsion. Some products are available commercially which are mixtures of mono- and triglycerdies.

The distributing agent can be incorporated into the potato mixture in any of several ways. A melted mixture of the mono- and triglyceride can be sprayed onto the flakes with concomitant agitation of the dry solids to obtain uniform distribution throughout the dry mass of material. The monoglyceride, in its fatty carrier as such or in aqueous emulsion, can be added to the moist cooked potato prior to, during or after mashing with sufficient mixing to ensure uniform distribution.

The dry flake component is mixed with the cooked mashed potato by any suitable means which ensures thorough blending, without excessive cell rupture, as, for example, by properly designed ribbon or paddle type mixers. The cooked potato can also be simultaneously mashed and mixed with the dry component by addition of the flakes prior to mashing in a suitable mixer. In this case the emulsifier is preferably previously added to the flakes.

After the moist and dry potato components have been blended to a moisture content of about 30 to 50%, preferably about 35 to 45%, the mixture should be given a conditioning or aging period of at least about 20 minutes, preferably about 30, during which it remains undisturbed or given at most an occasional gentle mixing. During this rest period, the moisture equilibrates between the wet and dry particles and retrogradation of a portion of the starch occurs to some extent. Longer conditioning periods can, of course, be employed if desired.

After the conditioning period, it is desirable again gently to mix the potato blend, since this increases separation of the potato particles without cell rupture and contributes toward a lump-free, uniform mashed potato product after rehydration.

The potato blend is now a loose, moist, friable mixture which can easily be dried in any conventional dryer, preferably one using heated air as the drying medium. Types of driers which can be employed include the airlift-cyclone type, the porous bed drier with or without a vibratory means for moving the material through the drier, a fluidized bed in which the entraining means is hot air, a directly or indirectly fired rotary drier, or a simple tray or cabinet drier. Drying temperatures and times should be chosen to coincide with good engineering practice in food dehydration. Temperature of the heating medium can be higher, e.g. up to about 300° F., at initiation of the drying cycle when sufficient moisture is present which, by evaporation, prevents excessive product heating. As drying progresses, the temperature of the heating medium is desirably lowered, e.g. to about 120°, to prevent overheating or scorching of the product. Drying is continued until the desired final moisture content is reached, e.g. about 4 to 8%.

A screening step may be introduced into the process at any convenient point. If the cooked mash is free of objectionable fragments, such as potato skin, screening will ordinarily not be necessary unless the mixing of the mashed potato and the flakes is not adequately efficient, so that some agglomerated lumps may be present. The screening out of such agglomerates can be done following the initial mixing operation, after the conditioning and second mixing step, or after the final drying operation. The screened agglomerates can be discarded or returned to an earlier step in the process for recycling, preferably the first mixing step.

A cooling or freezing step, as conventionally known and practiced in the art, can optionally be introduced into the process. This can be performed on the cooked mashed potatoes prior to admixture with the flake or on the mixture of the moist and dry components.

If the dried potato flakes employed are at least about 40 mils (18 mesh) in their largest dimension, a finished product of superior quality is produced by a single component mixing and drying procedure as aforedescribed.

The product is a granular, free flowing material having a high bulk density. Bulk density is rarely less than 28 lbs./cu. ft. and is as high as 48 lbs./cu. ft. or more. Viewed under magnification, the product comprises a mixture of fine potato flakes, monocellular particles, and multicellular aggregates or clumps of cells only or attached to the fine flakes. The preferred maximum size of the flakes in the finished product is about ⅛ to ¼ inch.

The product reconstitutes rapidly upon the addition of a liquid, such as water or milk, to a mashed potato of superior, uniform, mealy texture retaining substantially unimpaired the flavor and color of fresh mashed potatoes. The flavor and consistency, in fact are superior to those of the flaked product, which is generally considered to be excellent.

Since the process employs as its dry, moisture-reducing component, the product of a primary or single-stage drying process, heat sensitive compounds, such as vitamins, are retained substantially intact and no undesirable flavor changes are introduced. The process does not require the continued recycling of a major portion of a previous dried product, thereby, reducing cost and eliminating the hazard introduced by an improper run which might contaminate many subsequent cycles. A satisfactory flake for use in the process can, furthermore, be prepared in a single direct dehydration of cooked mashed potatoes, thereby eliminating the problems of producing a satisfactory initial seed powder inherent in the standard "add-back" process.

As aforementioned, flake products as small as about 40 mesh, can be employed in my process provided the product produced after the first moist and dry component mixing and dehydration is recycled with additional cooked mashed potato to eliminate the pastiness which would otherwise be produced. The processing is substantially similar to the first cycle except that the dehydrated flake is substituted by the dehydrated flake-mashed potato product. Mixture of this product with the moist mashed potato is more easily accomplished than with the flake so that additional monoglyceride distributing agent is not necessary. If pastiness of the finished reconstituted product is not eliminated by one recycling, two or at most three will generally be sufficient.

The advantage of the multi-cycling process lies in the fact that it makes possible the use of more finely divided flakes with resulting increased ease of moist and dry component mixing, the substantially complete elimination of any lumpiness which might require screening, and a somewhat smoother texture in the finished dehydrated product. Such recycling can also be applied where the initial flake size is 18 mesh or larger, but since the product produced by the first dehydration is so entirely satisfactory, there is ordinarily little advantage in so doing.

It should be noted that my process employing recycling differs markedly from the "add-back" process in important and advantageous respects. The flake used in the initial cycle is the product of a single dehydration and, therefore, retains original flavor and vitamins unlike the starting seed powder of the "add-back" process, which is the product of numerous recyclings. Furthermore, the major portion of each dehydration is not continuously returned for recycling as raw material for a succeeding product. All of the product of the first dehydration is subjected to a minimum of recycling to form a finished product, none of which is subjected to further recycling so that there is very little possibility of flavor deterioration.

Example I

Sound, mature Idaho Russett potatoes, having a solids content of about 21%, were washed, peeled, trimmed, sliced to about ½ inch slabs, and subjected to a precooking treatment by immersion in water at 160° F for about 20 minutes. The slices were washed in a stream of cold water to remove surface starch, then distributed onto a perforated belt passing through a steam cooker. The potatoes were subjected to atmospheric steam for about 30 minutes and mashed by passage through flaking rolls. A solution of a small amount of sodium bisulfite and citric acid was incorporated at this point. The mashed potato was applied to a drum dryer by a series of spreader rolls extending across the face of the dryer and rotating at the same peripheral speed as the drying drum. The layer of potato, after drying to a moisture content of about 6%, was removed from the drum by a doctor knife and broken into pieces, all of which passed through a 4 mesh U.S. standard seive.

The bulk density of the product was 16 lbs./cu. ft. The flakes, when reconstituted with three parts of boiling water and one part of cold milk, in the ratio of two cups of combined liquid to 90 grams of potato flakes, gave a very palatable mashed potato of good flavor, appearance and texture.

Example II 500 grams of the flake material of Example I was placed in a laboratory mixer. While the flakes were agitated at low speed, a melted mixture consisting of 2 g. of glyceryl monopalmitate and 18 g. of hydrogenated cottonseed oil, was sprayed onto the flakes and mixing continued for 1 minute.

Peeled Idaho Russet potatoes were sliced into longitudinal ¾ inch slices and steamed at atmospheric pressure for 60 minutes. At the end of this time, the potatoes could easily be mashed with a fork and separated into discreet potato cells to form a mealy, mashed potato, without undue cell damage. The cooked, sliced potatoes were pressed through a kitchen-type ricing device having holes ⅛ inch in diameter.

500 g. of this riced potato were added to the flakes in the mixer. Mixing was continued for two minutes at low speed and then for 3 more minutes at medium speed to obtain a uniform dispersion of the dry and moist components. The mixture was then allowed to set at room temperature for 30 minutes. After this conditioning period, the material was again mixed at medium speed for 3 minutes. The friable, moist mixture, which contained about 40% moisture by weight and 0.33% glyceryl monopalmitate on a dry basis, was transferred to a tray and dried in a drying oven at a temperature of 135° F. for 4 hours to a moisture content of 6%.

The final dried product, when viewed under magnification, was an assortment of fine potato flakes ranging in size from about one-eighth inch and downward, monocellular particles and multicellular clumps, and aggregates of cells attached to potato flakes.

The product was free flowing and had a bulk density of 35 lbs./cu. ft. When reconstituted according to the same recipe given in Example I, it produced a mashed potato of superior texture, appearance and flavor.

*Example III*

The identical procedure was followed as in Example II, with the exception that the monoglyceride distributing agent in a triglyceride carrier was omitted. The resulting product was extremely lumpy and inedible.

*Example IV*

The identical procedure was followed as in Example II, with the exception that the distributing agent was 4 g. of a homogenized mixture consisting of 25% glyceryl monopalmitate, 25% hydrogenated cottonseed oil and 50% water, and was added to the cooked mashed potatoes instead of being sprayed onto the flakes. Both the dehydrated and rehydrated products were of the same high quality as those of Example II.

Table I summarizes the results obtained when certain of the variables are manipulated, such as ratio of mash to flakes, mesh size of flakes, concentration of distributing agent, and addition of distributing agent to flakes or mash. The flakes and the cooked mash were made substantially as disclosed in Examples I and II.

that an emulsion consisting of 1 g. g.m.p., 4 g. Primex, and 5 g. water were added to the mash. The product was similar to that of A.

Table II gives the results with runs comparable in all respects except for the use of products varying in monoglyceride content. The total amounts used were adjusted to provide the same concentration of monoglyceride. Some variation was also made in amount of triglyceride addition. All of the products were excellent.

TABLE II

| Potatoes: | | | |
|---|---|---|---|
| Mash, g | 500 | 500 | 500 |
| Flakes, g | 500 | 500 | 500 |
| Size | ¹ 10 | ¹ 10 | ¹ 10 |
| Flake, lb./cu. ft. | 25.5 | 25.5 | 25.5 |
| Moisture in mix, percent | 42.5 | 42.5 | 42.5 |
| Monoglyceride, g.m.p.: | | | |
| Quantity, g | 2.0 | 3.0 | 4.5 |
| Percent in product | 0.35 | 0.52 | 0.78 |
| Mono content, percent | 90 | 60 | 40 |
| Percent Mono in product | 0.31 | 0.31 | 0.31 |
| Triglyceride, Primex: | | | |
| Quantity, g | 8 | 5 | 3.5 |
| Percent in product, total | 1.44 | 1.08 | 1.08 |
| Product: | | | |
| Texture | (²) | (²) | (²) |
| Lumps | None | None | None |
| Lb./cu. ft. | 39.6 | 43.0 | 45.5 |

¹ Mesh.
² Excellent.

TABLE I

| | Flakes | | | | | Product | | |
|---|---|---|---|---|---|---|---|---|
| Mash,¹ g. | G.² | Mesh ³ Size | Lbs./cu. ft. | G.m.p.⁴ Primex,⁵ g. | Added to— | Percent Moisture in Mix | Percent G.m.p. in Product MFB ⁶ | Taste Test, lbs./cu. ft. |
| 320* | 500 | 4 | 21 | 2/18 | Flakes | 32.2 | 0.37 | Good. |
| 320 | 500 | 4 | 21 | | do | 32.9 | 0 | Very lumpy. |
| 400* | 500 | 4 | 21 | 2/18 | do | 35.8 | .35 | Good 29. |
| 500* | 500 | 4 | 21 | 2/18 | do | 39.6 | .33 | Good 35. |
| 600* | 550 | 4 | 21 | 2/18 | do | 42.6 | .32 | Good. |
| 600* | 500 | 4 | 21 | 2/ | Mash | 42.6 | .32 | Lumpy. |
| 600* | 500 | 4 | 21 | 2/18 | do | 42.6 | .32 | Good 36. |
| 600* | 500 | 4 | 21 | —/20 | do | 42.6 | 0 | Lumpy. |
| 600* | 500 | 10 | 25.5 | 2/18 | Flakes | 42.6 | .32 | Good 41.5. |
| 600* | 500 | 10 | 25.5 | 2/18 | do | 42.6 | .32 | Good 480⁸. |
| 5 lbs | 5 lbs. | 4 | 21 | 9/—/27 H₂O | Mash | 42.5 | .198 | Lumpy. |
| 5 lbs | 5 lbs. | 4 | 21 | 9/—/27 H₂O | Flakes | 42.5 | .198 | Do. |
| 10 lbs | 10 lbs. | 8 | 23.6 | 25/100/125 H₂O | Mash | 42.5 | .28 | Good 40. |
| 10 lbs | 10 lbs. | 16 | 24.4 | 25/100/125 H₂O | do | 42.5 | .28 | Good 44.4. |

¹ *, percent moisture of mash 73.2%; others, percent moisture of mash 79%.
² The g.m.p./Primex, where added to the flakes, is sprayed on a portion of the flakes, which are then mixed with the untreated remainder.
³ Substantially all flakes pass through given mesh size, U.S. standard sieve.
⁴ Glyceryl monopalmitate.
⁵ Hydrogenated cottonseed oil.
⁶ Moisture free basis.
⁷ Reconstituted product.
⁸ Product after conditioning period given 10 minute instead of 5 minute remixing.

It will be noted that in the absence of monoglyceride and/or triglyceride, the reconstituted product was lumpy.

*Example V*

A. 300 g. of the last product listed in Table I was mixed with 300 g. of cooked mashed potato without further addition of distributing agent, given a conditioning rest period, remixed and dried. The recycled product had a bulk density of 44.5 lbs./cu. ft. and reconstituted to a mashed potato product of similar superior quality as the original dehydrated product.

B. The same procedure was followed as in A, except

Table III, A and B, shows the effect of one and two recyclings where the initial cycle employed 20 and 40 mesh products, which normally produces a pasty initial product. It will be noted that with the 20 mesh material, an acceptable product was obtained with one recycling and a superior product after two. The 40 mesh flake material was made into an acceptable product with two recyclings. As previously pointed out flakes substantially smaller than this are not acceptable for my process even with recycling.

TABLE III

| | A | | | B | | |
|---|---|---|---|---|---|---|
| | Cycle 1 | Cycle 2 | Cycle 3 | Cycle 1 | Cycle 2 | Cycle 3 |
| Potatoes: | | | | | | |
|   Mash g | 500 | 400 | 300 | 500 | 400 | 300 |
|   Flakes, g | 500 | [1] 400 | [2] 300 | 500 | [1] 400 | [2] 300 |
|   Size | [3] 20 | | | [3] 40 | | |
|   Moisture in mix, percent | 42.5 | 42.5 | 42.0 | 42.5 | 42.5 | 42.5 |
| Monoglyceride, g.m.p.: | | | | | | |
|   Quantity, g | 2.0 | | | 2.0 | | |
|   Percent in product | 0.35 | 0.30 | 0.26 | 0.35 | 0.30 | 0.26 |
|   Mono content, percent | 90 | | | 90 | | |
|   Percent Mono in product | 0.31 | 0.27 | 0.23 | 0.31 | 0.27 | 0.23 |
| Triglyceride, Primex: | | | | | | |
|   Quantity, g | 8 | | | 8 | | |
|   Percent in Product, total | 1.44 | 1.28 | 1.07 | 1.44 | 1.28 | 1.07 |
| Product: | | | | | | |
|   Texture | [4] | [5] | [6] | [7] | [4] | [5] |
|   Lumps | None | None | None | None | None | None |

[1] Product of cycle 1.
[2] Product of cycle 2.
[3] Mesh.
[4] Sticky.
[5] Fair.
[6] Good.
[7] V. sticky.

The granular product of this invention is unique in a number of important respects:

(1) It is the only presently known dehydrated mashed potato product which can be rehydrated successfully with liquid at any temperature, from cold to boiling.
(2) It can be thus rehydrated over a wider practical range, e.g. over a mesh size range of about −16 to −80, than can conventional "add-back" powder or potato flakes, even within their narrower temperature limitations.
(3) It closely approaches the bulk density of conventional "add-back" powder at −20 on 40 mesh (a generally desirable size because of its non-powdery, non-dusty texture) and has substantially the same bulk density at −80 mesh, but is satisfactorily reconstitutable at all liquid temperatures, into a mashed potato of excellent mealy texture having the color and flavor of freshly mashed potatoes.

Potato powders made according to the conventional "add-back" process reconstitute satisfactorily only with boiling liquid and then only at an exceedingly small mesh size namely −80, the standard commercial product. The required fineness of particle size is conducive of cell rupture and generally results in a Blue Value within the upper range of acceptability. This also results in a reconstituted mash having a creamy and somewhat slick texture rather than the dry, mealy texture which is generally obtained with properly prepared fresh mashed potatoes and which is generally preferred by the consumer.

Dehydrated flakes of any mesh size, including acceptable mesh size, can be satisfactorily reconstituted only with liquid at a temperature up to about 180° F. They can be reconstituted satisfactorily with cold liquid, but only down to a mesh size of about −20 on 40. Boiling liquid in all cases causes severe cell rupture of the flake cells and the release of excessive amounts of free starch. Reduction of flake size, before reconstitution, to less than about one eighth to one quarter inch also causes excessive cell rupture and free starch.

The granular product of this invention, in addition to its high bulk density, possesses the following advantages:

(1) Unlike potato flakes, it can be reconstituted with boiling water, thereby producing a hot mash and avoiding the necessity for careful regard to maximum temperature by the institutional, industrial, restaurant, or housewife consumer.
(2) Unlike the "add-back" powder it can be made directly into a cold mash, thereby eliminating the cost and time required for heating the reconstituting liquid and then cooling, for such institutional and industrial purposes as the making of frozen TV dinners, casseroles, mashed potato salads, meat fillers, potato fondant candy, potato French dressing, potato pancakes, and baked products using a potato-base dough.

*Example VI*

A dehydrated potato product was made as follows:

A. 8.1 g. Myverol 1807 (a mixture of distilled glyceryl monostearate and glyceryl monopalmitate) were added to 10 lbs. of hot potato mash and mixed for 2 minutes in a Hobart mixer at low speed. Twelve lbs. of dehydrated potatos flakes (size #5 mesh passed through a hammer mill) were added and mixed 5 minutes on low speed with a wire whip. The mixture was screened through a 16 mesh screen.

B. The oversize was returned to a fresh 10 lb. batch of hot mash to which was added Myverol 1807 and dehydrate potato flankes as above, except that mixing after addition of the Myverol was for 5 minutes at low speed with a paddle and mixing after addition of the flakes was for 5 minutes at low speed with a paddle and for 5 minutes at medium speed with a wire whip. The mixture was screened through 16 mesh.

C. The oversize on 16 mesh was returned to a fresh hot potato mash and (B) repeated.

The mixtures of flakes and mash which had passed through the 16 mesh screen in each of A, B, and C, were permitted to equilibrate moisture content, given a gentle mixing, and dried. The combined dehydrated product, which will be indentified as "granules," was used in the following tests.

The granule product was compared with a product made according to the conventional "add-back" process, which will be identified as "powder" and with dehydrated potato flakes.

I. Each dehydrated potato product—powder, granule, and flake—was screeneded to obtain the fraction passing through 20 mesh and held on 40 mesh, and bulk density of the through fraction determined. Each of the −20 on 40 fractions was then identically reconstituted with boiling water and with cold tap water.

The Blue Value of each reconstituted potato mash was determined to evaluate the amount of free starch, according to standard industry procedure as follows:

500 cc. of distilled water is heated to 80° F. 10 g. of the potato mash sample is added with continued heating and agitation for 5 minutes. The mixure is allowed to settle for 20 minutes and then filtered through a #1 hatman filter paper, 5 ml. of the filtrate is added to 45 ml. of 0.0005 N iodine solution. After mixing and standing for 15 minutes, the Blue Value is measured in a Klett colorimeter.

Products having Blue Values above 100 are considered unacceptable by the industry. The lower the Blue Value, the better is the product, since this indicates lesser starch cell rupture.

CHARACTERISTICS OF THE RECONSTITUTED PRODUCTS

|  | Powder | Granule | Flake |
|---|---|---|---|
| Density, lbs./cu. ft. | 46.50 | 42.16 | 26.66 |

A—BOILING WATER MASH

|  | Powder | Granule | Flake |
|---|---|---|---|
| Blue Value | 80 | 26 | 154 |
| Texture | Lumpy | Excellent, mealy, no lumps [1] | Pasty |
| Edibility | Inedible | Excellent | Undesirably sticky |

B—COLD WATER MASH

|  | Powder | Granule | Flake |
|---|---|---|---|
| Blue Value | 6 | 1 | 19 |
| Texture | Sandy, free water | Excellent, mealy, no lumps [1] | Excellent, mealy, no lumps [1] |
| Edibility | Inedible | Excellent | Excellent |

[1] Resembled freshly mashed potatoes in every respect.

II. Each of the dehydrated potato products was screened to obtain the fraction passing through an 80 mesh standard screen, and bulk densities determined.

A portion of each of the −80 mesh fractions was identically reconstituted with boiling water and with cold tap water and the Blue Value of each reconstituted mash determined.

CHARACTERISTICS OF THE RECONSTITUTED PRODUCTS

|  | Powder | Granule | Flake |
|---|---|---|---|
| Density, lbs./cu. ft. | 53.32 | 53.32 | 46.50 |

A—BOILING WATER MASH

|  | Powder | Granule | Flake |
|---|---|---|---|
| Blue Value | 76 | 26 | 230 |
| Texture | Good, creamy, somwehat slick | Excellent, mealy, no lumps [1] | Lumpy, so pasty could not be uniformly mixed |
| Edibility | Good | Excellent | Inedible |

B—COLD WATER MASH

|  | Powder | Granule | Flake |
|---|---|---|---|
| Blue Value | 25 | 13 | 385 |
| Texture | Sandy, water only partly absorbed | Excellent, mealy, no lumps [1] | Lumpy |
| Edibility | Inedible, gritty in mouth | Excellent | Inedible |

[1] Resembled freshly mashed potatoes in every respect.

Although this invention has been described with reference to illustrative embodiments thereof, it will apparent to those skilled in the art that the principles of this invention can be embodied in other forms but within the scope of the claims.

I claim:

1. A process for making dehydrated mashed potatoes which comprises admixing dehydrated cooked mashed potato flakes with cooked mashed potato and a minor amount of a fatty acid monoglyceride distributing agent, said dehydrated flakes being employed in an amount sufficient to reduce the moisture content of the mixture to about 30 to 50%, permitting said mixture to rest with a minimum of agitation for at least about 20 minutes, remixing, and then drying said mixture.

2. The process of claim 1 in which the distributing agent is a fatty acid monoglyceride admixed with a fatty acid triglyceride.

3. The process of claim 2 in which both the monoglyceride and the triglyceride are substantially saturated higher fatty acid compounds.

4. A process for making dehydrated mashed potatoes which comprises admixing dehydrated cooked mashed potato flakes, said flakes being of such size in their largest dimension that the smallest mesh size, U.S. standard sieve, through which substantially all of the flakes can pass, is 18 mesh, with cooked mashed potato and a minor amount of a mixture of a fatty acid monoglyceride and a fatty acid triglyceride, said dehydrated flakes being employed in an amount sufficient to reduce the moisture content of the mixture to about 30 to 50%, permitting said mixture to rest with a minimum of agitation for at least about 20 minutes, remixing, and then drying said mixture.

5. The process of claim 4 in which the monoglyceride and triglycerides are substantially saturated higher fatty acid compounds.

6. The process of claim 4 in which the moisture content of the dehydrated flake and cooked mashed potato mixture is about 35 to 45%.

7. The process of claim 5 in which the moisture content of the dehydrated flake and cooked mashed potato mixture is about 35 to 45%.

8. The process of claim 4 in which dehydration of the mixture is accomplished by means of heated air.

9. The process of claim 7 in which dehydration of the mixture is accomplished by means of heated air.

10. The process of claim 6 in which the monoglyceride is glyceryl monopalmitate.

11. The process of claim 6 in which the monoglyceride is glyceryl monopalmitate and the triglyceride is hydrogenated cottonseed oil.

12. A process for making dehydrated mashed potatoes which comprises admixing dehydrated cooked mashed potato flakes, said flakes being of such size in their largest dimension that the smallest mesh size, U.S. standard sieve, through which substantially all of the flakes can pass, is 40 mesh, with cooked mashed potato and a minor amount of a mixture of a fatty monoglyceride and a fatty acid triglyceride, said dehydrated flakes being employed in amount sufficient to reduce the moisture content of the mixture to about 30 to 50%, permitting the mixture to rest with a minimum of agitation for at least about 20 minutes, remixing, drying said mixture, and then processing said dried product through at least one recycling procedure comprising, admixing said dried product with cooked mashed potato in amount sufficient to reduce the moisture content of the mixture to about 30 to 50%, permitting said mixture to rest with a minimum of agitation for at least about 20 minutes, remixing, and then drying said mixture.

13. The process of claim 12 in which the monoglyceride and the triglyceride are substantially saturated higher fatty acid compounds.

14. The process of claim 13 in which the moisture content of the dehydrated flake and mashed potato mixture is about 35 to 45%, and the moisture content of the recycled dried product and mashed potato mixture is about 35 to 45%.

15. The process of claim 14 in which the monoglyceride is glyceryl monopalmitate.

16. The process of claim 15 in which the triglyceride is hydrogenated cottonseed oil.

17. The process of claim 1 in which the potatoes employed in making the flakes are subjected to a precooking step at a maximum temperature of about 160° F. for a period up to about 60 minutes, prior to cooking and mashing.

18. The process of claim 17 in which the potatoes employed in making the cooked mashed potatoes to which said flakes are added, are also subjected to said precooking step.

19. A process for making dehydrated mashed potatoes which comprises admixing dehydrated cooked mashed potato flakes with moist cooked potato and a minor amount of a fatty acid monoglyceride distributing agent, said moist cooked potato being in mashed state at completion of said admixing, said dehydrated flakes being employed in an amount sufficient to reduce the moisture content of the mixture to about 30 to 50%, permitting the moisture to equilibrate between the moist cooked potato and the dehydrated flakes, mixing at some point during the interval between the beginning of the equilibration period and final drying, and then drying said mixture.

20. The process of claim 19 in which the moist cooked potato component is mashed prior to addition of the dehydrated flakes.

21. A process for making dehydrated mashed potatoes which comprises forming a mixture by mixing dehydrated cooked mashed potato flakes with moist cooked potato, said mixing being carried out in the presence of and said mixture containing a minor amount of a fatty acid monoglyceride, said moist cooked potato being in mashed state at completion of said mixing, said dehydrated flakes being employed in an amount sufficient to reduce the moisture content of the mixture to about 30 to 50%, permitting the moisture to equilibrate between the moist cooked potato and the dehydrated flakes, mixing at some point during the interval between the beginning of the equilibration period and final drying, and then drying the mixture.

22. The process of claim 21 in which the moist cooked potato is mashed prior to addition of the dehydrated flakes.

23. A dehydrated, substantially granular, cooked mashed potato product, which can be readily reconstituted by the addition of liquid, comprising a mixture of the following components: (1) small potato flakes, (2) discrete potato cells, (3) clumps of potato cells, and (4) aggregates of potato cells attached to small flakes, said potato product having a minimum bulk density of about 28 lbs./cu. ft. to about 48 lbs./cu. ft. and a particle size of between approximately ¼" to about −80 mesh, said components of said dehydrated potato product each being present in an effective amount sufficient to enable the potato product to be reconstitutable with an aqueous liquid at all temperatures from cold to boiling.

References Cited by the Examiner

UNITED STATES PATENTS

| 2,381,838 | 8/1945 | Rendle | 99—207 |
| 2,787,553 | 4/1957 | Cording et al. | 99—207 |
| 3,021,223 | 2/1962 | Eskew | 99—207 |

A. LOUIS MONACELL, *Primary Examiner.*

R. S. AULL, *Assistant Examiner.*